United States Patent [19]

Hewel et al.

[11] Patent Number: 4,943,625
[45] Date of Patent: Jul. 24, 1990

[54] ADHESIVE COPOLYAMIDE COMPOSITION BASED ON PHENYLENE CONTAINING DIAMINE

[75] Inventors: Manfred Hewel, Bonaduz, Switzerland; Annette Lavalette, Richmond, England; Frank Annighofer, Heidenrod, Fed. Rep. of Germany

[73] Assignee: Ems-Inventa AG, Domat/Ems, Switzerland

[21] Appl. No.: 241,406

[22] Filed: Sep. 7, 1988

[30] Foreign Application Priority Data

Sep. 9, 1987 [CH] Switzerland ................. 03472/87

[51] Int. Cl.$^5$ .............................. C08G 69/14
[52] U.S. Cl. .................... 528/324; 528/325; 528/329.1; 528/331; 528/337; 528/338; 528/339; 528/340; 528/347
[58] Field of Search ............. 528/324, 325, 329.1, 528/331, 337, 338, 339, 340, 347

[56] References Cited

U.S. PATENT DOCUMENTS

| 3,919,033 | 11/1975 | Gill et al. ........................ 528/324 |
| 4,024,116 | 5/1977 | Horn et al. ....................... 528/324 |
| 4,102,871 | 7/1978 | Horn et al. ....................... 528/324 |
| 4,118,351 | 10/1978 | Murray et al. ................... 528/324 |
| 4,386,197 | 5/1983 | Panoch et al. ................... 528/324 |
| 4,566,931 | 1/1986 | Panoch et al. ................... 528/324 |

FOREIGN PATENT DOCUMENTS 1390604 4/1975 United Kingdom .

*Primary Examiner*—Harold D. Anderson
*Attorney, Agent, or Firm*—Jordan Bierman

[57] ABSTRACT

An adhesive copolyamide composition having a dry powder DSC melting point of at least 100° C., a glass transition temperature above 60° C., a dry powder softening point of at least 100° C., preferably a water content after storage in water of more than 20% by weight, and a wet softening point of less than 100°. Such compositions exhibit softening points and heat resistances in excess of 100° C. and can be processed and set at substantially lower temperatures. No low molecular weight additives are required nor are any solvents necessary. The compositions are comparable in their heat-resistance, softening points, and bond strength to conventional high performance hot melt adhesives.

23 Claims, No Drawings

ADHESIVE COPOLYAMIDE COMPOSITION BASED ON PHENYLENE CONTAINING DIAMINE

This Application claims the benefit of the priority of Swiss Application No. 3,472/87, filed Sept. 9, 1987.

The present invention relates to polyamide adhesive compounds, more particularly those with improved workability, adhesive qualities, and temperature resistance after processing. Such compositions are, partly due to the presence of moisture during processing, temperature resistant up to temperatures higher than those used during processing.

BACKGROUND OF THE INVENTION

Aliphatic polyamide forming components such as caprolactam, laurinlactam, hexamethylenediamine adipate, etc. are known for use in connection with adhesive compounds if the monomer composition is chosen so that the melting points of the polyamides are between 70° and 150° C. Such compositions are described in DE 12 53 449 DE 22 63 922, DE 23 24 159, DE 23 24 160, DE 32 48 776, U.S. 39 33 762, CH 491 150, CH 482 756, and CH 540 311. The materials set forth in these patents show good resistance to deterioration after washing or dry cleaning.

Copolyamides of caprolactam, laurinlactam and m-xylylene diamine adipate are described in JP 79 023 397. Also, JP 74 019 093 discloses copolyamides comprised of caprolactam and salts of m-xylylene diamine and dodecane dioic acid. Both of these compositions are taught to have good resistance to dry cleaning and washing. Other patents describe copolyamides derived from xylylene diamine and dimeric fatty acids as being useful in adhesive compounds (see NL 174 563, NL 7 508 420, JP 81 029 687, and CA 887 138).

Such copolyamides are highly resistant to the solvents used in dry cleaning and also to water normally used in washing. Moreover, in addition to their adhesive strength, they have very high temperature resistance, especially when compared to other materials such as the ethylene/vinyl acetate or styrene/butadiene copolymers. These are recognized in the field as "high performance hot melt adhesives" (see F. Eichhorn and Th. Reiner, Electro-Anzeiger 34/7, 33, 1981).

However, the foregoing adhesives possess an important disadvantage. In order to process or set them, it is necessary to elevate the temperature to the softening or distortion point. Axiomatically, this means that the shape of the applied adhesive *cannot* be easily maintained. Moreover, since the temperature resistance of the bond corresponds to the softening temperature of the material, it is necessarily below the temperature which must be used in order to process the adhesive.

On the other hand, it is known to produce polymers which have low processing or setting temperatures. These must contain additives which produce soft or sticky properties (see U.S. Pat. Nos. 3,792,002; 3,449,273; and 3,787,342). However, in spite of the presence of the aforementioned additives, the temperature resistance of such polymers is lower than those of the polyamide adhesives which have no such additives. Furthermore, the adhesive properties of these polymers are inferior to those of the copolyamide adhesives.

GENERAL DESCRIPTION OF THE PRESENT INVENTION

As a result of the foregoing, it is desirable to find adhesive materials which exhibit good adhesion and high levels of temperature resistance, but which are processable or settable at relatively low temperatures. Moreover, this goal should be accomplished without the need for solvents which may be detrimental to the environment and in the absence of other additives which have been used to produce soft and sticky properties.

It has been found that certain copolyamides, when used in the presence of moisture, can be processed at temperatures far below their softening or distortion points. In addition, their temperature resistant properties remain unchanged and are determined by the softening point itself. It is, therefore, possible to set or process such adhesives without even approaching the softening (distortion) point.

Indeed, the adhesive characteristics exhibited by the compositions of the present invention are fully comparable to those which heretofore could only be obtained by the use of the aforementioned high performance hot melt adhesives. Moreover, unlike the conventional hot melt adhesives containing additives, the materials of the present invention do not require the presence of any low molecular components which would normally escape and damage the environment. Also, the heat resistance and adhesive properties of the present invention are substantially higher than those of the additive-containing hot melt adhesives. As a result of these properties, the setting temperatures can be kept extremely low. This not only makes the adhesives of the present invention easier to use, but also saves energy and minimizes damage to the elements being adhered.

DETAILED DESCRIPTION OF THE INVENTION

It has been found that copolyamides fulfilling the foregoing requirements can be obtained provided certain parameters are met. The preferred characteristics are as follows:

(a) A DSC melting point of at least 100° C. This melting point is measured on the dry powder at a heating rate of 20° C./min. The preferred range is 120° to 185° C.

(b) A glass transition point ($T_g$) under 60° C. Preferably, the $T_g$ should be between 25° and 60° C. Measurement takes place on the dry powder by heating above its melting point and then chilling with carbon dioxide snow. $T_g$ is the point during the second heating where the slope of the DSC curve changes.

(c) The softening point, measured according to the Kofler-Bank method on the dry powder, is at least 100° C. The preferred range is 110° to 160° C.

(d) When stored in water at 23° C. for 16 hours, the water takeup should be more than 20% by weight, measured by the Karl Fischer titration method. Preferably, it should contain more than 25% water by weight.

(e) The softening point measured by the Kofler-Bank method on the dampened powder as described in the previous paragraph, is below 100° C., in particular from 45° to 100° C.

The foregoing composition is processed or set in the presence of moisture at less than 60° C., in particular below 30° C. Moreover, it produces a bond which is heat resistant to above 110° C., preferably 130° to 180° C., and most preferably from 140° to 160° C.

It has been found advantageous to use copolyamides which derive from polyamide-forming components of a salt or mixture of at least one diamine having 6 to 22 carbon atoms of the formula

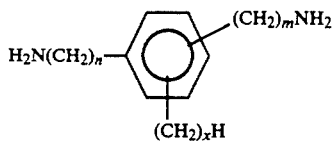

wherein n is 0 to 6, m is 0 to 6, and x is 0 to 4; at least one aliphatic dicarboxylic acid having 6 to 12 carbon atoms; or of at least one aliphatic diamine having 6 to 12 carbon atoms and at least one aromatic dicarboxylic acid having 8 to 10 carbon atoms or mixtures thereof.

Particularly suitable are diamines of the foregoing formula wherein n is 1 or 2, m is 1 or 2, x is 0, and the acid is adipic, azelaic, sebacic, or dodecanedioic. Copolymers of hexamethylenediamine and terephthalic acid, isophthalic acid, or toluene dicarboxylic acid can also be used with the foregoing compounds.

Of special suitability is a copolyamide which is based on 15 to 55% by weight of a salt or mixture of m-xylylene diamine and adipic acid, and/or hexamethylenediamine and isophthalic acid. The remainder of the foregoing composition is made up of the usual aliphatic polyamide forming components. Typically, lactams and/or ω-amino carboxylic acids having 6 to 12 carbon atoms, salts or mixtures of aliphatic diamines having 4 to 12 carbon atoms, and aliphatic dicarboxylic acids having 4 to 12 carbon atoms. Preferably, both the aliphatic diamines and the aliphatic dicarboxylic acids should have 6 to 12 carbon atoms. Mixtures of the various polyamide forming components may also be used advantageously.

An especially desirable composition, is based on 1 to 50% by weight of a salt or mixture of hexamethylenediamine and adipic acid together with 25 to 75% by weight of caprolactam and/or ω-amino caproic acid. It is preferred that there be 1 to 40% by weight of the adipate and 30 to 60% by weight of the caprolactam and/or ω-amino caproic acid.

The compositions of the present invention are produced as powders, granules, adhesive films, etc. The particular shape is not critical and any of the usual forms are useful and appropriate.

The compositions of the present invention are applied as, for example, a powder, film, or a molten mass, to one or both of the substrates to be bonded. The polymer is moistened, using water or steam, and the substrates are brought into contact with one another. The actual bonding takes place at a temperature substantially lower than the softening point of the original, dry polyamide adhesive composition.

The actual bonding takes place preferably below 60° C., more preferably below 30° C., and most preferably at room temperature. It has been noted that, after the drying of the bond is completed, the heat resistance, as previously indicated herein, is much greater than the bonding temperatures. Once the bond has dried and set, its heat resistance and bonding strength remain comparable to the conventional high performance hot melt adhesives. The composition remains hard, even after the repeated application of water. In fact, the solid state of the adhesives of the present invention can be altered only by exposure to temperatures above their softening points, i.e. by a second melting. Once this is done, the adhesive can be reused in the same manner as previously described.

The following examples are intended to illustrate the present invention and are not to be considered limitative thereof. Examples 7 and 8 define the composition of the present invention, while Example 9 is directed to conventional copolyamide adhesives, while Examples 10 and 11 set forth conventional polyamide adhesives which contain additives.

PRODUCTION OF COPOLYAMIDES

Examples 1 to 6 and Comparative Examples 7 to 9

Caprolactam, hexamethylene diamine adipate (AH-salt) and m-xylylene diamine adipate (MXDA.6-salt), hexamethylene diamine isophthalate (6.IPS-salt) and/or ω-amino lauric acid (as shown in Table 1) were weighed into a reaction vessel made of special steel. After closing, the vessel was flushed with nitrogen and then set into a metal block preheated to 180° C. After 15 minutes melting time, the monomer molten mass was stirred. After one hour the mixture was heated, under continuous stirring, to 250° C. after five hours reaction time the vessel was emptied. The copolyamide mass was then tempered at 70° C. for two hours.

The particular compositions used are found in Table 1 and the properties thereof are found in Table 2.

TABLE 1

| | Composition of the adhesive compounds. | | | | |
|---|---|---|---|---|---|
| Example | Caprolactam Wgt. % | AH-salt Wgt. % | MXDA.6-salt Wgt. % | 6.IPS-salt Wgt. % | ω-Amino lauric acid Wgt. % |
| 1 | 40 | 20 | 40 | | |
| 2 | 33 | 28 | 39 | | |
| 3 | 55 | 15 | 30 | | |
| 4 | 25 | 25 | 50 | | |
| 5 | 40 | 30 | | 30 | |
| 6 | 55 | 15 | 10 | 20 | |
| 7 | 20 | 46 | 34 | | |
| 8 | 60 | 30 | 10 | | |
| 9 | 60 | 20 | | | 20 |

TABLE 2

| | Properties of the adhesive compounds. | | | | | |
|---|---|---|---|---|---|---|
| | | | | After storage | | |
| Example | Melting point °C. | Glass trans. point °C. | Dry Softening point °C. | Wet Softening point °C. | Water content Wgt. % | Adhesion after moistening |
| 1 | 126 | 33 | 133 | 73 | 28 | adhesion |
| 2 | 139 | 53 | 141 | 77 | 52 | " |
| 3 | 138 | 36 | 142 | 81 | 55 | " |
| 4 | 175 | 57 | 134 | 90 | 29 | " |
| 5 | 121 | 26 | 110 | 49 | 27 | " |
| 6 | 141 | 54 | 128 | 60 | 31 | " |
| 7 | 157 | 39 | 160 | 124 | 32 | no adhesion |
| 8 | 157 | 25 | 149 | 102 | 31 | " |
| 9 | 144 | 21 | 140 | 92 | 31 | " |

Comparative Example 10

50% by weight of the copolyamide from Example 9 was formulated as described in U.S. Pat. No. 3,787,342, with 5% by weight of a glycerol ester from a resin modified with fumaric acid and 2.5% by weight of a paraffin with a melting point of 55° C.

Comparative Example 11

As described in U.S. Pat. No. 3,449,273, a copolyamide adhesive, comprising 90% by weight of the copolyamide of Example 9, was mixed with 10% by weight naphthol.

Bonding With Powder

The polyamides as set forth in Table 3 were ground in a pinned disc mill at -80° C. A polyester non-woven needle-punched carpet weighing 200 g/m² was coated with 50 g/m² of the powder. The powder was then sintered under an infra-red radiation lamp under mild conditions. The Examples described in the Table as "damp" were then sprayed with water on the coated side. The material was then placed in a flat press under a pressure of 2 kp/cm² and bonded using Tritex phenol-resin press plates. The bonding strength was determined in accordance with DIN 54 310. To determine the heat resistance, tests specimens 2×8 cm were loaded with 0.4 N/2 cm and heated at a rate of 1° C./min. The maximum heat resistance was the temperature at which the bonding strength was less than 0.4 N/2 cm.

Bonding With Film

The melt adhesive mass was pressed at elevated temperatures to form a film 50 microns thick. The adhesive film was used in the same manner as the powder of the previous example, the tests performed were the same, and the results obtained were also the same. They are set forth in Table 4.

TABLE 3

| Adhesive from example | State | Bonding with powder. | | |
|---|---|---|---|---|
| | | Bonding temp. °C. | Peel strength. N/2 cm | Heat resistance after processing. °C. |
| 1 | damp | 30 | 7,6 | 148 |
| 2 | " | 30 | 6,9 | 154 |
| 3 | " | 30 | 7,3 | 152 |
| 4 | " | 30 | 7,5 | 140 |
| 5 | " | 30 | 6,4 | 135 |
| 6 | " | 60 | | No bonding |
| 7 | " | 60 | | No bonding |
| 8 | " | 50 | | No bonding |
| 9 | dry | 30 | | No bonding |
| 9 | damp | 30 | | No bonding |
| 9 | dry | 150 | 1,3 | 135 |
| 9 | damp | 150 | 5,7 | 145 |
| 9 | dry | 165 | 6,5 | 151 |
| 9 | damp | 165 | 6,9 | 145 |

TABLE 4

| Adhesive from example | State | Bonding with film. | | |
|---|---|---|---|---|
| | | Bonding temp. °C. | Peel strength. N/2 cm | Heat resistance after processing. °C. |
| 1 | damp | 30 | 10,3* | 148 |
| 2 | " | 30 | 11,0* | 155 |
| 3 | " | 30 | 10,9* | 159 |
| 10 | dry | 30 | | No bonding |
| 10 | damp | 30 | | No bonding |
| 10 | dry | 120 | 2,1 | 117 |
| 10 | damp | 120 | 2,2* | 124 |
| 10 | dry | 135 | 9,6* | 126 |
| 10 | damp | 135 | 10,2* | 129 |
| 11 | dry | 30 | | No bonding |
| 11 | damp | 30 | | No bonding |
| 11 | dry | 110 | 1,3 | 105 |
| 11 | damp | 110 | 2,5 | 115 |

TABLE 4-continued

| Adhesive from example | State | Bonding with film. | | |
|---|---|---|---|---|
| | | Bonding temp. °C. | Peel strength. N/2 cm | Heat resistance after processing. °C. |
| 11 | dry | 125 | 10,1* | 121 |
| 11 | damp | 125 | 9,8 | 116 |

*substrate fracture of the phenol-resin plate.

While only a limited number of specific embodiments of the present invention have been expressly disclosed, it is, nonetheless, to be broadly construed and not to be limited except by the character of the claims appended hereto.

What we claim is

1. An adhesive copolyamide composition based on at least one first polyamide-forming component selected from the group consisting of aromatic diamines having 6 to 22 carbon atoms of the formula

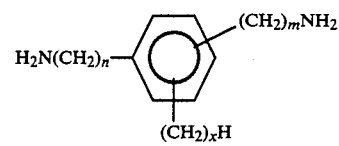

wherein
n=0 to 6, m=0 to 6, and x=0 to 4, and salts thereof;
at least one second polyamide-forming component selected from the group consisting of aliphatic dicarboxylic acids having 6 to 12 carbon atoms and aliphatic diamines having 6 to 12 carbon atoms and;
at least one aromatic dicarboxylic acid having 8 to 10 carbon atoms;
said composition having:
(a) a dry powder differential scanning calorimetry (DSC) melting point of at least 100° C., measured at a heating rate of 20° C. per minute,
(b) a dry powder glass transition temperature not exceeding 60° C.,
(c) a dry powder softening point, measured by the Kofler-Bank method, of at least 100° C., and
(d) a Kofler-Bank wet softening point, measured on dampened powder, of less than 100° C.,
whereby a bond formed from said composition in the presence of moisture is heat-resistant to at least 100° C.

2. A composition of claim 1 wherein said melting point is 100° C. to 185° C.

3. The composition of claim 1 wherein said melting point is 120° C. to 185° C.

4. The composition of claim 1 wherein said glass transition temperature is 0° C. to 60° C.

5. The composition of claim 1 wherein said glass transition temperature is 25° C. to 60° C.

6. The composition of claim 1 wherein said dry softening point is 100° C. to 160° C.

7. The composition of claim 1 having a water content, after storage in water for more than 16 hours at 23° C., of more than 20 percent by weight.

8. The composition of claim 7 wherein said water content is more than 25 percent by weight.

9. The composition of claim 1 wherein said water softening point is 45° C. to 100° C.

10. The composition of claim 1 which is heat-resistant to 130° C. to 180° C.

11. The composition of claim 1 which is heat-resistant to 140° C. to 160° C.

12. The composition of claim 1 wherein n=1 or 2, m=1 or 2, and x=0, and said aliphatic acid is selected from the group consisting of adipic acid, azelaic acid, sebacic acid, and dodecanedioic acid.

13. The composition of claim 1 wherein said one diamine is hexamethylene diamine, and said aromatic acid is selected from the group consisting of terephthalic acid, isophthalic acid, and toluene dicarboxylic acid.

14. The composition of claim 1 wherein said salts or mixtures are of m-xylylene diamine and adipic acid, hexamethylene diamine and isophthalic acid, or mixtures thereof.

15. The composition of claim 1 containing 15 to 55 percent by weight of said salts or mixtures based on said composition.

16. The composition of claim 15 containing 45 to 85 percent by weight of said second polyamide forming components based on said composition, said second components being other than said salts or mixtures.

17. The composition of claim 16 wherein said second components are selected from the group consisting of lactams and ω-amino carboxylic acids having 6 to 12 carbon atoms, salts or mixtures of aliphatic diamines having 4 to 12 carbon atoms, aliphatic dicarboxylic acids having 4 to 12 carbon atoms, and mixtures thereof.

18. The composition of claim 17 wherein said aliphatic diamines have 6 to 12 carbon atoms, and said aliphatic dicarboxylic acids have 6 to 12 carbon atoms.

19. The composition of claim 17 containing 1 to 50 percent by weight of hexamethylene diamine adipate and 25 to 75 percent by weight of a substance selected from a group consisting of caprolactam, ω-amino caproic acid, and mixtures thereof.

20. The composition of claim 19 containing 1 to 40 percent by weight of said adipate and 30 to 60 percent by weight of said substance selected from the group consisting of carprolactam, ω-amino caproic acid, and mixtures thereof.

21. A method of bonding using the composition of claim 1 as a bonding material, wherein bonding is achieved by processing said composition at a temperature below 60° C. in the presence of moisture.

22. The method of claim 21 wherein said composition is processed at a temperature below 30° C.

23. The method of claim 21 wherein said composition is processed at room temperature.

* * * * *